Nov. 2, 1954     P. D. WURZBURGER     2,693,376

DOUBLE-BITING RING PIPE COUPLING

Filed Jan. 23, 1953

*INVENTOR.*
PAUL D. WURZBURGER
BY
ATTORNEYS

:::

United States Patent Office 2,693,376
Patented Nov. 2, 1954

2,693,376

DOUBLE-BITING RING PIPE COUPLING

Paul D. Wurzburger, Cleveland Heights, Ohio

Application January 23, 1953, Serial No. 332,954

5 Claims. (Cl. 285—122)

This invention relates to pipe or tube couplings and to the art of coupling or connecting tubes or pipes with bodies for fluid communication therewith. In certain aspects this invention comprises an improvement upon the so-called "Ermeto" coupling of the type illustrated in U. S. Patent No. 2,211,856 and in other aspects an improvement upon the coupling disclosed in my co-pending application Serial No. 160,347, filed May 5, 1950.

It is among the objects of my invention to enhance features and advantages of the Ermeto type coupling and my prior invention and to improve upon each and gain new advantages from features of both. Another object is to provide a coupling adapted for use with prior and existing Ermeto type bodies but with improved tube gripping, sealing and coupling effects and results. Another object is to provide a tube or pipe coupling with a shorter nut and coupling element and an enhanced grip and seal upon the tube wherewith to get a better joint between the coupling and the tube, and to save the material incident to the shortening of the parts through which the coupling is effected. Another object is to provide a coupling characterized by a shorter coupling element with however an increased proportion of gripping area between the coupling element and the tube in relation to the length of the coupling element. Another object is to provide a tube coupling characterized by a strong mechanical grip upon the tube to be coupled through a cutting engagement between the coupling element and the tube and also characterized by a wide and extensive non-cutting constricting grip and engagement of the tube highly resistant to deleterious effects from vibration. Another object is to provide a coupling of great strength and security that may be effected with low wrench torque and relatively few turnings of the "nut" of the coupling combination. Another object is to provide a coupling that has the facility and smoothness of grip of the familiar compression coupling but also has an enhanced mechanical connection between the coupling element and the tube.

Other objects are to provide a novel sealing and gripping element to seal and grip the tube to be coupled more effectively and without, or with less hazard, of constricting thin-walled tube undesirably or cutting into the wall of the tube more deeply than is necessary or desirable; to provide a coupling which during the operation of making the joint will reflect a "feel" to the operator that the joint has been completed as by a marked increase in wrench torque; to provide a coupling having a cutting edge adapted to turn up a ridge of appreciable size from the wall of the tube or piece to be coupled wherewith to grip the same positively and securely, but also to restrict the depth of the cut and the size of the ridge and at the same time to grip and confine the ridge and to grip the tube adjacent the ridge and at a spaced distance from the cutting edge whereby to enhance the grip upon the tube and more firmly secure the tube mechanically and effect a complete fluid seal and withal to limit more effectively the construction of the tube incident to making the sealed joint. Another object is to provide a self-contained coupling element which within itself under the influence of longitudinally acting compressive forces converts and distributes those forces into gripping, cutting and sealing forces and motions to embrace the tube to be coupled and to substantially integrate the same in relation thereto. Other objects include the provision of means of accomplishment of the foregoing objects that are economical of manufacturing costs and facile, enduring and advantageous in use.

These and other objects will appear from the following description of a preferred form of my invention, reference being had to the accompanying drawings in which.

Figure 1:
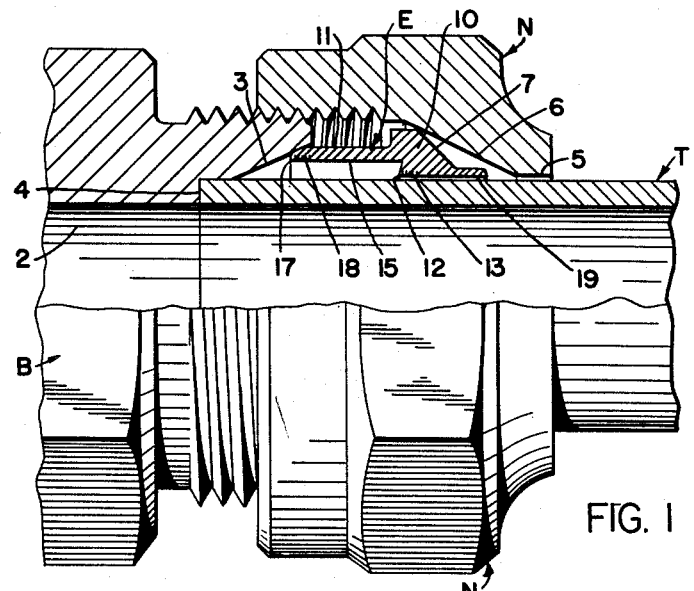
Figure 1 is a side elevation partly in broken longitudinal section of an illustrative embodiment of a preferred form of my invention with the parts shown in assembled relation preliminary to effecting the coupling thereof and the joint therebetween.
Figure 2:
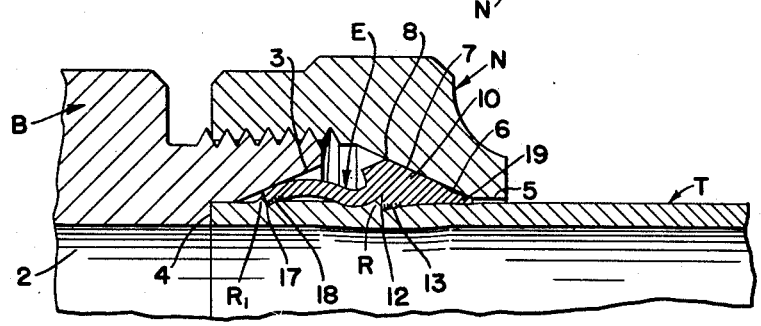
Figure 2 is a fragmentary longitudinal section corresponding to the sectional part of Figure 1 showing however the parts in their coupled and joined relation.
Figure 3:
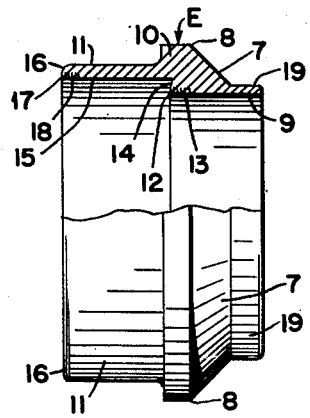
Figure 3 is a side elevation partly in longitudinal section of the coupling element shown in part in Figures 1 and 2.

Referring now more particularly to the preferred form of my invention illustrated in Figures 1, 2 and 3 the body B may be taken as illustrative of any of the many forms of bodies or instrumentalities to the rearward, rightward as viewed, end of which the tube T is to be joined. The body B has an internal bore 2 corresponding to the interior of the tube T, a stepped shoulder 4 against which the extreme end of the tube T bears, and rearwardly of the shoulder 4 and the adjacent counterbore, the body has the characteristic internal rearwardly opening flared, preferably conical, mouth 3 characteristic of the Ermeto type coupling. The body may also have external male threads for coaction with the female threads of the nut N through the rearwardly disposed bore 5 of which the tube T passes. Extending forwardly and outwardly from the bore 5 of the nut there is provided an inclined, preferably conical, camming shoulder 6 between which and the flared mouth 3, the body of the coupling element E is worked into tube gripping and sealing engagement when the nut and body are forcibly drawn together by the threaded coaction therebetween. It will be understood that the nut and body may take any one of many external forms and configurations including the familiar flanged body and flange ring for useful participation in my invention so long as their internal characteristics for coaction with the coupling element E and the tube as described and disclosed herein are preserved.

The coupling element E takes the form of an annulus adapted to encircle the tube T near but a little rearwardly of the extreme end of the tube and comprises a rearward thickened ring portion 10 having an internal substantially cylindrical bore 9 of internal diameter affording a sliding fit over the exterior of the tube T. The coupling element E also comprises a forwardly extending elongated relatively thin walled sleeve portion 11 having an internal bore or counterbore 15 of substantially greater diameter than the bore 9 which terminates at its rearward end in a radial shoulder or face 14 which I prefer be raked rearwardly and outwardly and have substantially conical form pitched at about 80° from the axis of the bore 9, that is, raked rearwardly at about 10°. Preferably the sleeve and ring portions of the element E are formed integrally and for many practicable purposes may be turned from free machining rod or tubular stock having or susceptible of acquiring the characteristics of strength, weakness and hardness variously as will be more fully described below. The element E also comprises an annular relatively thin walled rearward extension 19 formed integrally with the ring at its rearward and smallest portion having its bore coextensive with and in continuation of the bore 9 of the ring portion.

The ring portion 10 of the element E, as measured between the sleeve 11 and extension 19, is approximately as long as it is thick and has a rearwardly and outwardly facing camming shoulder or surface 7, preferably substantially conically formed and pitched more steeply than the shoulder 6 of the nut N to which it is juxtaposed and with which it coacts, cf. Figures 1 and 2. When the surface 6 of the nut N is pitched at about 30° from the axis of the nut, as I prefer, then the surface 7 of the ring 10 may and preferably should be pitched at about 45° so that the surface 7 of the ring will have an angular differential from the surface 6 of about 15°. The differential angle is related to the rake of the face 14, and my preference is that while the specific values of those angles may be substantially modified that the relation between them may with advantage be preserved, having in mind, however, that when the relation of the rake angle is reduced in respect to the differential angle the rake will tend to be negative at the end of the cutting action—a thing not necessarily disadvantageous especially with tubes of relatively soft material. Conversely increasing the rake angle, as machinists appreciate, tends to facilitate cutting action, described more fully below, at the expense however of the strength of the cutting edge or bit. The absolute or effective angles of the surfaces 6 and 7 respectively may also be modified, as for example plus or minus 5°, with or without changing the differential angle between them, but preferably preserving a substantial differential angle for the reasons appearing above and elsewhere in this specification. Flattening the angle of the surfaces 6 and 7, other things remaining equal increases the radial component relative to the axial component exerted by the nut on the ring and increases the mechanical advantage of the nut over the ring, requiring more turns of the nut per increment of work done on the coupling element, things that are often helpful in dealing with tubes that are hard to cut and grip. The converse follows as the angles of the surfaces 6 and 7 are made more steep.

The ring part 10 also has an exterior short cylindrical surface, the rearward end of which intersects the shoulder 7 in an annular exterior and rearward corner or abutment 8 which is disposed to have initial, substantially exclusive, contact with the camming shoulder 6 of the nut N. At the inner and forward corner of the ring 10 as viewed in transverse section the raked surface 14 intersects the bore 9 in a sharp circular annular cutting edge 12. The surface of the bore 9 at and adjacent to the edge 12 and for a limited area therebehind is preferably surface hardened as I have suggested by the shade lines at 13 for a depth of from about 1 to 3 thousandths of an inch. This limited surface hardening at and adjacent the edge 12 gives the edge desirable cutting characteristics with respect to the tube and also permits desirable constriction of the edge and the body of the ring adjacent thereto and is not subject to nor does it tend to invite deleterious fracture of the ring or edge while the same is being constricted and the cutting operation carried out. The edge 12 preferably lies a little rearwardly of the foremost and outermost portion of the ring 10 and is longitudinally near and radially far from the annular corner 8 of the ring with the result that when the joint is completed the corner 8 tends to overlie the edge 12 so that the "worked" ring as shown in Figure 2 tends to have its maximum radial dimension and thickness radially outwardly of the edge 12.

The sleeve portion 11 of the element E is preferably about 50% to 75% longer than the ring 10 and from about ⅓ to ¼ as thick. The forward and outer corner 16 of the sleeve 11 is preferably rounded to have smooth non-abrasive sliding contact with the flared mouth 3 of the body, and the extreme foremost end of the sleeve preferably presents a radial face sharply intersecting the forward end of the bore 15 at an abrupt angle, preferably at about 90° or a little less forming a sharp cutting edge 17 similar to the edge 12 but preferably having a little less rake wherewith to tend to be more restrained in its cutting action into the surface of the tube than the edge 12. Preferably the surface of the bore 15 immediately adjacent to and rearward of the edge 17 is surface hardened at 18 similarly to the surface hardening 13 adjacent the edge 12 described above.

The material of which the coupling element may be made admits of a considerable choice depending in part upon the material and character of the tube to be coupled as well as the materials that are desired to be employed in the nut and body. My greater preference is to use S. A. E. 1117 steel for the stock of the coupling element because it is freely machinable and admits of case or surface hardening throughout all parts of the element including the sleeve of the element E as well as the cutting edge or edges, without deleterious impairment of the flexibility and workability of the flexed and worked parts characteristic of the mode of operation of my coupling element. Using S. A. E. 1117 steel I do not necessarily harden the coupling element, other than work hardening by the necessary machining, so long as its cutting edge or edges are harder than the tube to be cut. With steel or stainless steel or other harder tubes the wholly surface hardened S. A. E. 1117 steel coupling element provides satisfactory cutting edges and preserves desirable workability in the other parts of the element. My lesser preference is to use other free machining steels for the coupling element and, when used with tubes that are harder than the unhardened element, to confine the hardening of the element to limited areas adjacent the cutting edge or edges. Using aluminum body, nut and tube, or steel or brass nuts and bodies with copper tube, for example, the coupling element may be made of such steel and not hardened so long as it is of greater hardness than the tube to be coupled. On steel tubes I may use a steel coupling element of similar hardness but of free machinability, which after being machined and formed is given a light case hardening preferably only on the surface adjacent the edge as in the areas 13 and 18 as by cyaniding and carbo-nitriding to have a case of as little as one to two thousandths inches deep. Dealing with stainless steel tubing, I find it practicable to harden the cutting edge and areas 13 and 18 more deeply and to a greater degree of hardness while largely avoiding hardening of the sleeve and/or the rest of the coupling element. The surface hardening may be confined to the areas 13 and 18 by copper plating the whole element lightly and then scuffing off the plating at the areas 13 and 18 before submitting the element to a case hardening treatment whereby to confine the hardening substantially to those areas and the cutting edges. While I mention this manner of localized hardening with especial reference to coupling steel and stainless steel tubing, I do not confine myself in this example of hardening to that or any other specific use but cite it for illustration of and within the precepts and teachings of my invention.

To facilitate understanding and practice of my invention an example of size and proportion of the parts of the coupling element is given by way of further illustration and exemplification, as follows:

For ½" O. D. tube the bore 9 exceeds ½" only by enough to take care of variations in commercial tolerance of the tube and coupling element to afford a free sliding fit. The outside diameter of the ring is about .680". The length of the sleeve 11 on the outer surface is about .125" to .150" long, and, as measured between the edge 17 and the face 14 is about .145" to .170" long. The radial depth of the surface 14, i. e. the radial height of the sleeve "above" the edge 12 and the bore 9 and "above" the outside of the tube in the first instance is about .03", the thickness of the sleeve about .0185" to .02" and the inward spacing of the outside of the bridge from the O. D. of the ring is about .04". The outer cylindrical surface of the ring is about .03" to .04" long; the overall length of the ring being about .1" to .12" and the extension 13 preferably extending about .03" to .04" rearwardly from the ring per se and being about .015" to .02" thick. While the drawings are not necessarily exactly at proportionate scale, I have undertaken to make them correspond substantially to the dimensional proportions here given. For rule of thumb the mean length of the ring may be taken as approximately equal to its maximum thickness. For tubes of greater and smaller size my experience has been that all the dimensions above stated should not be or should not necessarily be modified proportionately for the best practice of my invention. For example, in making a coupling element for a one inch tube the bores and the external diameters of the ring and sleeve might well be approximately doubled in respect to the ½" size but the overall length of the coupling may be but moderately increased, but the length and thickness of the sleeve and its spacing from the tube may well be kept the same as in the ½" size although the mean diameter of the bridge would have to be approximately doubled as compared with the ½" size.

In the operation of this preferred form of my invention when the nut N is forcibly advanced toward the body B the camming shoulder 6 of the nut engages the corner or abutment 8 of the ring urging the coupling element E forwardly toward the body with the forward outer corner 16 of the sleeve engaging the flared mouth 3 of the body and tending to be constricted thereinto and, by its resistance to such constriction, resisting pro tanto axial forward movement of the whole of the coupling element E and beginning to develop an unbalanced couple between the corner 8 and the junction of the sleeve with the ring tending to rotate the ring counterclockwise as viewed in the drawings, cf. Figures 1 and 2. With the parts proportioned as described above this initial resistance of the sleeve to axial motion of the element preferably does not initiate such substantial rolling motion of the ring as to bring the edge 12 into contact or effective cutting contact with the outside surface of the tube. Continued forward motion of the nut toward the body continues the bodily forward motion of the whole coupling element E and the progressive constriction of the forward end of the sleeve with continued or increasing reaction between the rearward end of the sleeve and the ring until the forward end of the sleeve is so constricted as to bring the edge 17 thereof into contact and engagement with the wall of the tube, see Figure 2. Thereupon the edge 17 tends to but doesn't necessarily begin to cut into the tube and adds another force sharply resistant to further axial movement of the sleeve forwardly and consequently further resistance is offered by the sleeve to forward movement of the lower mid-portion of the ring thereby strongly inducing the ring to take its forward rolling motion and begin cutting action by the edge 12 into the tube a little rearwardly of the position shown in Figure 2. Continued forward motion of the nut toward the body now proceeds to urge the edge 17 into fuller cutting engagement with the tube tending to cut and turn up a ridge R1 in front of the forward end of the sleeve which cutting and turning up of the ridge R1 or tending to cut and turn up the ridge rapidly increases the resistance of the forward end of the sleeve to further forward axial motion. The rapidity with which this resistance is increased depends in some considerable measure upon the rake or bluntness of the extreme forward face of the sleeve and my preference is that the bluntness of the edge 17 be such that a relatively small but complete annular cut by the edge 17 will so raise the resistance of the forward end of the sleeve to forward axial motion as to compel the inward deflection and/or buckling of the rearward end of the sleeve and the rolling of the ring and the cutting action by the edge 12 into the tube. As taught in my copending application the sleeve 11 is strong axially and weak radially, i. e. strong enough in resistance to axial compression to develop an unbalanced couple between its point of reaction on the ring and the corner 8 to roll the ring forwardly and inwardly when the forward end of the sleeve is held against or in strong resistance to axial motion, and is weak enough in resistance to inward deflection and/or buckling near the ring to facilitate and enhance the rolling of the ring, constriction of the cutting edge 12 and the initiation of cutting the tube by the edge 12. Cutting engagement between the edge 12 and the tube necessarily offers resistance to forward motion which augmented by continued and measurable resistance of the partially deflected and buckled rearward end of the sleeve to free forward bodily motion of ring prevents mere scuffing of the tube by the edge 12 and compels the continued rolling of the ring, constriction of the edge and combined inward radial and forward motion of the edge into the tube and the turning up of the ridge R2 of appreciable size along the raked face 14. The rolling of the ring is accompanied by a sliding forward movement of the nut and its camming shoulder 6 over the corner 8 of the ring, working the corner portion of the ring forwardly and constricting it and the cutting edge inwardly and advancing the cutting edge forwardly withal. Further forward motion of the nut toward the body promotes the cutting action of the edge 12, turning up the ridge R2, and buckling the rearward end of the sleeve inwardly upon the tube and the ridge and forcing the ridge into confinement under the buckled rearward end of the sleeve until the parts reach substantially the position shown in Figure 2. Meanwhile the ring will have been rolled until substantially the whole of its shoulder 7 will have acquired full engagement with the shoulder 6 of the nut, and throughout these later described actions the forward end of the sleeve will continue to tend to exert its cutting action by the edge 17 on the tube and establish a fluid-tight engagement with the flared mouth 3 of the body and the tube. The rolling action of the ring induced by the nut N is accompanied by a relative differential motion between the nut and the ring; the nut overtaking the ring in its forward axial motion and, among other things described above, the camming shoulder 6 of the nut makes contact with the rearward outer corner of the rearward extension 19 of the coupling element E, deflecting and constricting that extension into a wide firm vibration resistant grip upon the tube rearwardly of the ring.

As a result of the several actions induced by the working of the coupling element E as above described, the two ridges R1 and R2 forward of the respective cuts made by the edges 17 and 12 have been turned up holding the tube with great strength against high blowout pressures tending to move the tube rearwardly from the body. Also a tight leakproof fluid seal is effected between the forward end of the sleeve and the flared mouth of the body, and the tube is held firstly in a constricting fluid-tight grip behind the edge 17 by the forward end of the sleeve, secondly in a tight constricting and/or fluid-tight grip by the buckled rearward end of the bridge which also confines, grips and constricts the ridge R2, by a third constricting fluid-tight grip by and behind the edge 12; by a fourth constricting grip between the body of the constricted ring 10 and the tube and by a fifth firm and increased constricting grip between the rearward extension 19 and the tube. In sum, the coupling element E is worked to have a substantially continuous grip upon the tube throughout the length of the element augmented by two cuts into the tube and thus substantially and advantageously integrated with the tube to enhance the coupling thereof with the body in the mutual embrace of the nut and body. As shown in Figure 2 a mid-portion of the sleeve 11 is out of contact with the tube, but if literal continuous contact throughout the entire length of the coupling E is desired it may be effected by employing a somewhat shorter sleeve.

While I have illustrated and described a preferred form of my invention and given illustrations of the best ways presently known to be to practice and enjoy it, changes, modifications and improvements will occur to those skilled in the art who come to understand the principles thereof and the precepts of this teaching, and, therefore, I do not care to be limited in the scope of my patent to the form or forms herein specifically illustrated and described or in any manner inconsistent with the progress by which the art has been promoted by my invention.

I claim:

1. A tube coupling comprising a body having a rearwardly opening flared mouth, an abutment for the tube and a bore with which the tube is to have fluid connection, a coupling member having a bore through which the tube passes and having a forwardly and outwardly flaring camming shoulder spaced from said body and movable toward the same, a coupling element comprising a rearwardly disposed radially thick axially short and axially inflexible ring part with a bore closely encircling the tube and a forwardly disposed radially thin axially long and axially flexible tubular part encircling and spaced from the tube, said coupling element lying between said flared mouth and said shoulder and adapted to be worked by both said mouth and shoulder, said ring part having an inner radial face forming with said bore a first internal cutting edge and having an outer radial portion longitudinally adjacent said inner face, said tubular part having substantially uniform wall thickness of approximately one-third the thickness of said ring part and of length several times its wall thickness and having its forward end entering and outwardly engaging said flared mouth and yieldably resisting constriction and longitudinal movement therein and yieldably resisting relative axial movement of said ring part of the coupling element toward said forward end of said tubular part and toward said body, said flexible tubular part joining said ring part radially between the said inner radial face and said outer radial portion of said ring part and having an inwardly disposed second cutting edge at its forward end adapted to cut and engage the tube, said ring part having a forwardly and outwardly inclined rearward surface of greater angle than and juxtaposed to said camming shoulder with the outer margin outwardly spaced from said flexible part and near the radial plane of the said inner radial face to engage said camming shoulder initially at said outer margin, said flexible tubular part increasingly resisting forward movement of its forward end into the body as said forward end is moved into and worked in said flared mouth and said second cutting edge is constricted into cutting engagement with the tube, and said flexible tubular part yieldably resisting forward movement of said ring part under the influence of said camming shoulder after said second cutting edge has engaged the tube and tending to induce forward rolling motion of the ring part and constriction of said first cutting edge into the tube with flexing and weakening of the flexible tubular part between said edges and buckling the same inwardly and forcibly upon the tube with relative axial movement of said ring part toward said forward end of said flexible part and with axial and radial cutting action of said first edge into the tube in response to further forcible forward movement of said camming shoulder, said first cutting edge having relative axial motion toward said second cutting edge after the latter has made an appreciable cut within the flared mouth of the body.

2. In the tube coupling combination of a body having a rearwardly opening flared mouth within which a forward portion of the tube is disposed and a bore with which the tube is to be coupled for fluid communication, a coupling member associated with the body for forcible forward movement toward the body and having a bore encompassing the tube and having a forwardly facing, forwardly and outwardly flaring camming shoulder, a coupling element encompassing the tube between said mouth and said shoulder and having a forwardly facing internally disposed cutting edge adjacent the tube and being adapted to be worked between said mouth and said shoulder with appreciable forward and inward tube cutting motion of said edge and into sealing engagement with the tube and said mouth of the body, and means holding the tube against substantial forward motion while said coupling element is being worked, the improvement that said coupling element comprise a forward end entering and engaging said mouth and adapted to be advanced and constricted therein into tight engagement with the tube and fluid-tight engagement with said mouth and thereafter held substantially immovable in respect thereto, a rearward ring part engageable by said shoulder and movable thereby relative to said forward end and forwardly toward said end, and a deformable flexible portion between said end and said ring part yieldably admitting motion of said ring part toward said end when said end is held against motion and said shoulder is forcibly moved toward said mouth, said ring part having a bore encircling the tube and having an inner forwardly disposed and forwardly facing surface intersecting the bore and forming said tube cutting edge adjacent the tube, said ring part being approximately as thick as its length and being relatively inflexible in relation to said flexible portion and having an outer and rearwardly disposed inclined surface juxtaposed to said shoulder and more steeply inclined than said shoulder whereby to have initial contact with said shoulder along an outer and forward margin which is radially far from and axially near said cutting edge, said flexible portion having sufficient strength in resistance to forward motion of said ring part to induce constriction of said cutting edge under the influence of said shoulder and said flexible portion tending to be weakened with constriction of said cutting edge and become yielding to forward axial motion of said ring part and to forward axial and inward radial motion of said cutting edge under the forcible influence of said shoulder.

3. The combination in a tube coupling of a body to the rearward end of which the forward end of a tube is coupled, said body having a rearwardly opening flared mouth within which a forward part of the tube is disposed and an abutment for the end of the tube, the tube having a forward annular groove with a tapered rearward surface and an abrupt forward face spaced from the extreme forward end of the tube and lying within said flared mouth, a coupling member having a bore for the tube and forcibly coacting with said body, said member having a forwardly and outwardly inclined camming shoulder encircling the tube, the tube also having a rearward groove with a tapered rearward surface and an abrupt forward face spaced rearwardly from said forward groove and lying within said camming shoulder, and a deformed coupling element forcibly gripped between said member and said body and gripping the tube and having a fluid tight engagement with the tube and with said body, the rearward end of said element comprising a short thick substantially inflexible ring-like part having an outward and rearward inclined surface engaged by and constricted by the camming shoulder of said member and having an inwardly and forwardly tapered bore forcibly engaging said rearward tapered surface of said rearward groove and stressing said tube in radial compression within said bore and having a substantially radially disposed inner forward face defining an edge at the forward end of said bore and forcibly engaging the forward face of said rearward groove and stressing said tube in axial compression toward said abutment, said edge being embedded in said rearward groove in the tube radially inward and substantially under said camming shoulder, said element also comprising a flexible thin walled tubular part integrally formed with said ring-like part and extending forwardly therefrom from above said inner face and having an annular portion buckled inwardly upon the tube between said grooves, and having a forward annular end portion constricted by said flared mouth into forcible radial engagement with the rearward tapered surface of said forward groove and stressing said tube in radial compression within said mouth and having a substantially radially disposed forward face forcibly engaging the forward face of said forward groove and stressing said tube in axial compression toward said abutment.

4. The combination in a tube coupling of a body having a rearwardly opening flared mouth within which the forward end of a tube is disposed and having an abutment for the end of the tube; the tube having forwardly and rearwardly disposed annular grooves each with a tapered rearward surface and an abrupt forward face and spaced from each other and from the extreme forward end of the tube, and the tube having annular ridges of appreciable size turned up from the stock of each of the grooves adjacent the forward faces of the grooves, a coupling member having a bore for the tube rearwardly of said grooves and forcibly coacting with said body, and a worked and deformed coupling element forcibly gripped between said member and body and mechanically gripping the tube in, between and adjacent said grooves and having a fluid tight engagement with the tube and with said body, said body having its flared mouth facing and engaging the forward end of said element, said member having a forwardly and outwardly inclined camming shoulder engaging the rearward end of said element, the forwardly of said grooves lying within said flared mouth and the rearwardly of said grooves lying within said camming shoulder, the rearward end of said element comprising a thickened axially substantially inflexible ring-like part having an outward and rearward forwardly inclined surface engaged by said camming shoulder and having an inwardly and forwardly tapered bore forcibly engaging said rearward tapered surface of said rearward groove and stressing said tube in radial compression within said bore and having a substantially radially disposed inner forward face defining a cutting edge at the forward end of said bore and forcibly engaging the forward face of said rearward groove and the rearward side of said rearward ridge and stressing said tube in axial compression against the said abutment of said body, said cutting edge being embedded in said rearward groove in the tube radially inward and substantially under a portion of said camming shoulder, said element also comprising an annular inwardly constricted portion adjacent said inner face forcibly compressing said ridge, said element also comprising a deformed and stressed flexible part extending forwardly from said last named portion of said element and having an annular rearward portion buckled inwardly upon the tube adjacent said ridge between said grooves, and having a forward portion including the forward end of said element forcibly constricted by said flared mouth into said forward groove and stressing said tube in radial compression within said mouth and having an end face with an inner cutting edge forcibly engaging the forward face of said forward groove and the rearward side of said forward ridge and stressing said tube axially against said abutment, said last named cutting edge being embedded in said forward groove under a portion of said flared mouth.

5. In the tube coupling combination of a body having a rearwardly opening flared mouth within which a forward portion of the tube is disposed, and an abutment for the end of the tube, a coupling member associated with the body for forcible forward movement toward the body and having a bore encompassing the tube and having a forwardly facing, forwardly and outwardly flaring camming shoulder, a coupling element encompassing the tube between said mouth and said shoulder and having internally disposed axially spaced and relatively movable tube cutting edges and adapted to be worked between said mouth and said shoulder with appreciable forward and inward sequential tube cutting and gripping motions of said edges and into radially constricted engagement with the tube adjacent and between said edges, the improvement that said coupling element comprises a forwardly disposed axially flexible tubular part having length several times its wall thickness and having a first cutting edge inwardly disposed at its forward end, said forward end entering and engaging said mouth and adapted to be advanced and constricted therein into cutting engagement with the tube and into fluid-tight engagement with said mouth and bottomed substantially immovable in respect thereto, and comprises a rearwardly disposed axially inflexible ring part engageable by said shoulder and movable thereby toward said body and relative to said forward end, said flexible tubular part yieldably admitting motion of said ring part under the influence of said shoulder toward said end when said end is bottomed in said mouth, said ring part having a bore encircling the tube and having an inner forwardly disposed face of limited radial extent intersecting the bore and forming a second tube cutting edge adjacent the tube, said ring part being approximately as thick as its length and having an outer and rearwardly disposed inclined surface juxtaposed to said shoulder and more steeply inclined than said shoulder whereby to have initial contact with said shoulder along an outer and forward margin which is radially far from and axially near said second cutting edge, said flexible part joining said ring part radially between said margin and said face and having sufficient strength in resistance to forward motion of said ring part relative to said forward end to induce constriction of said first cutting edge in said mouth and to induce a first cutting action of said first edge into the tube and sequentially to induce constriction of said second cutting edge under the influence of said shoulder, and said flexible portion tending to be weakened and buckled inwardly with constriction of said second cutting edge and become yielding to additional forward axial motion of said ring part and to relative forward axial and inward radial motion of said second cutting edge relative to said first cutting edge under the continued forcible motion of said shoulder.

References Cited in the file of this patent

UNITED STATES PATENTS

| Number | Name | Date |
|---|---|---|
| 2,211,856 | Kreidel | Aug. 20, 1940 |
| 2,522,785 | Hanson | Sept. 19, 1950 |
| 2,641,487 | La Marre | June 9, 1953 |

FOREIGN PATENTS

| Number | Country | Date |
|---|---|---|
| 569,135 | Great Britain | May 7, 1945 |
| 915,008 | France | Oct. 24, 1946 |
| 468,677 | Canada | Oct. 10, 1950 |
| 835,541 | Germany | Apr. 3, 1952 |